May 1, 1951 E. N. MILLAN 2,551,278
STEEL MELTING PLANT
Filed Sept. 23, 1949 3 Sheets-Sheet 2

Inventor
EDWARD N. MILLAN,
By
Allen & Allen
Attorneys.

May 1, 1951 E. N. MILLAN 2,551,278
STEEL MELTING PLANT
Filed Sept. 23, 1949 3 Sheets-Sheet 3
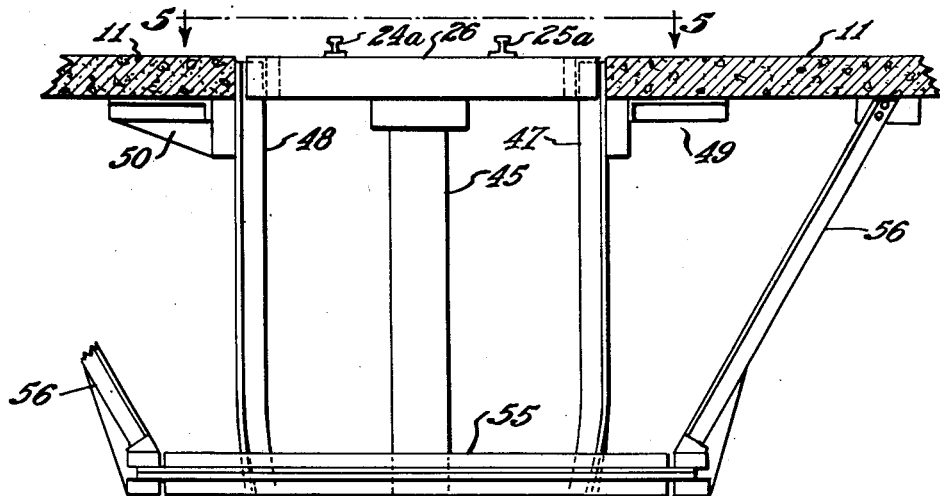
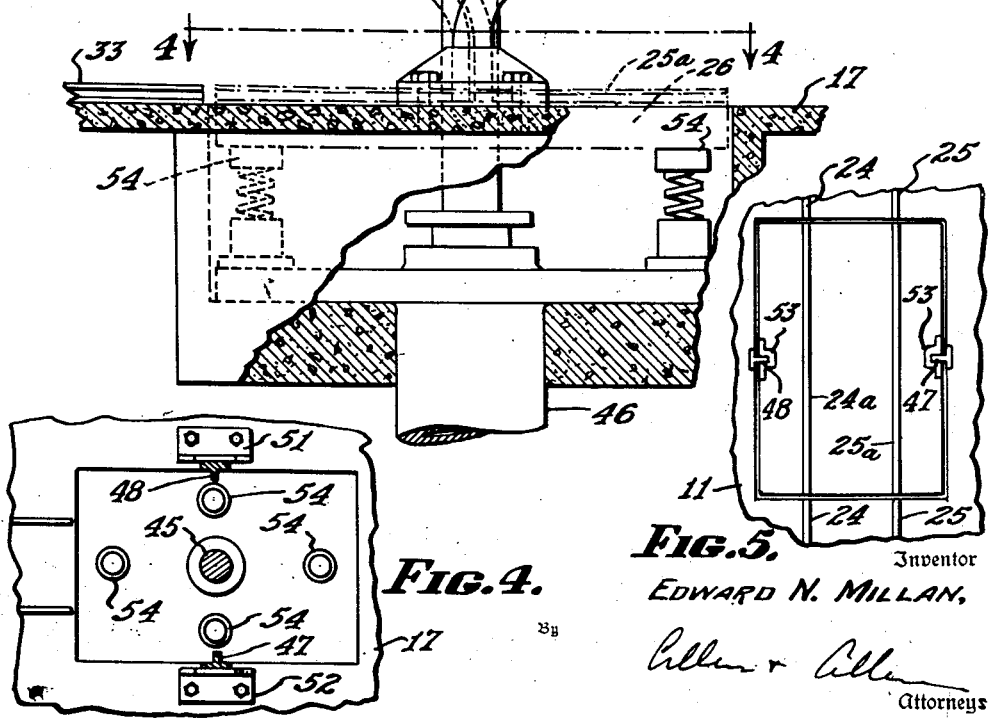
Inventor
EDWARD N. MILLAN,
Attorneys.

Patented May 1, 1951

2,551,278

UNITED STATES PATENT OFFICE 2,551,278

STEEL MELTING PLANT

Edward N. Millan, Middletown, Ohio, assignor to Armco Steel Corporation, Middletown, Ohio, a corporation of Ohio Application September 23, 1949, Serial No. 117,381

10 Claims. (Cl. 266—13)

This invention relates to a steel melting plant, and more particularly to an arrangement for charging melting furnaces without interfering with the operation of furnaces which are not being charged, whether the furnaces be open hearth or electric melting furnaces.

In the conventional steel melting plant the furnaces are positioned in a battery side by side in a single row. A charging floor extends along the front of the row of furnaces above yard level. A charging machine runs on rails running substantially the length of the battery of furnaces so that it may charge any furnace as required. The charging pans which contain the pig iron, steel scrap and other materials with which the furnace is to be charged, are transported on special charging cars of standard or narrow gauge which operate on a track running the length of the battery of furnaces. The charging machine lifts the charging pans from the cars which are positioned between the charging machine and the furnace.

All charging or loading cars are brought onto the charging floor and move lengthwise of the building in front of the row of furnaces, to the particular furnace which is to be charged. This, of course, interferes with the operation of the remaining furnaces so that with conventional means for supplying material to be charged to the furnaces to be charged, steel production is slowed down because of the slow rate at which a charging operation can be carried out, and because of the interference with the operation of the other furnaces in the battery.

With the foregoing considerations in mind it is an object of my invention to provide an arrangement whereby each furnace in the battery can be charged without interfering with the operations of any other furnace. It is another object of my invention to provide an arrangement whereby all traffic of charging cars, full and empty, passes only the particular furnace being charged.

Another object of my invention is to eliminate the movement of charging cars lengthwise of the battery of furnaces and thereby to eliminate the interference with the operation of furnaces which are not being charged.

Still another object of my invention involves the provision of a charging car track running along in front of the battery of furnaces at charging floor level, sections of said track between each two furnaces and at each end of the battery of furnaces, being mounted on elevators and provided with turning means, so that a car positioned on a section of track mounted on an elevator will, either in dropping from the open hearth or charging floor to yard level, or before or after dropping, be turned through a quarter-turn or other suitable angle. Where the term "quarter-turn elevator" is used hereinafter, it will be understood to refer to a structure where the elevator turns through an angle during its lift or drop, without limitation as to the specific angle traversed.

It is yet another object of my invention to provide at yard level below the charging floor a series of tracks leading from each of the elevators to a remote scrap loading station.

It is therefore still another object of my invention to cause all traffic of charging cars, except for the immediate front of the furnace to be charged, to be carried out at yard level and not on the charging floor.

Still another object of the invention is the provision of an arrangement whereby a charging car is elevated on an elevator to one side of the furnace to be charged, moved across the front of that particular furnace for charging, and is removed from the charging floor back to yard level on an elevator on the other side of the furnace being charged, so that the only traffic on the charging floor during the charging of any one furnace will be one way traffic in front of that furnace only.

These and other objects of the invention which will be pointed out in more detail hereinafter, or which will be apparent to those skilled in the art to which this invention relates, are accomplished by that certain construction and arrangement of which I shall now disclose an exemplary embodiment. Reference is made to the drawings forming a part hereof, and in which:

Figure 3 is an elevational view of a quarter-turn elevator with parts in section;

Figure 4 is a cross-sectional view taken on the line 4—4 of Figure 3, on a reduced scale, and Figure 5 is a plan view taken on the line 5—5 of Figure 3.

Briefly, in the practice of my invention I provide in association with a number of furnaces a track running along the charging floor in front of all the furnaces. Sections of this track between each two furnaces, and at each end of the battery, are mounted on quarter-turn elevators whereby said sections of track may be lowered from charging floor level to yard level, incidentally executing a quarter-turn, and returned from yard level to charging floor level with a reverse turn. At yard level I provide a series of tracks adapted to connect with the elevator mounted sections of tracks when at yard level and running to a remote scrap loading station.

Figure 1:
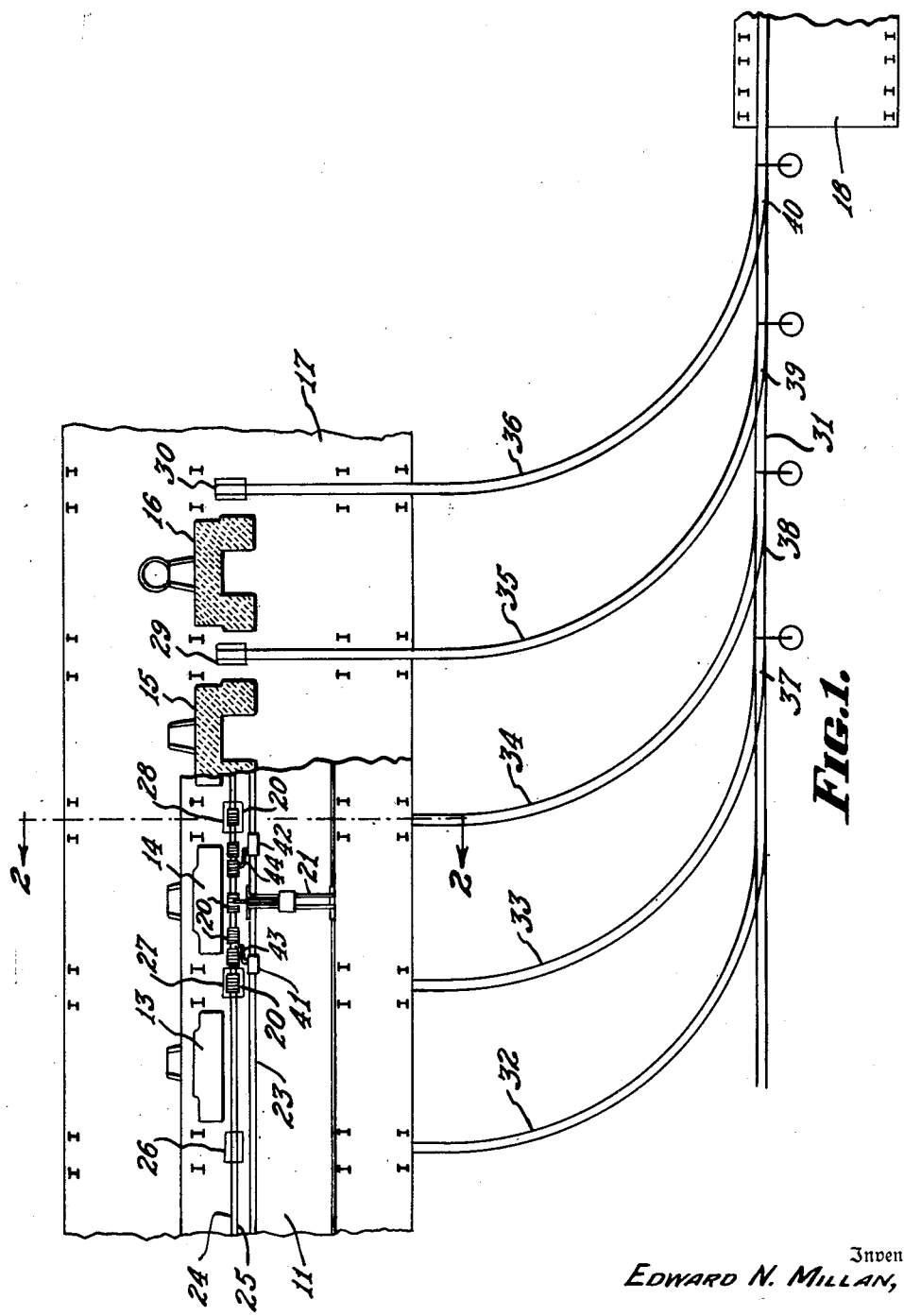
Figure 1 is a diagrammatic representation of an open hearth steel plant showing four furnaces constituting a battery of furnaces.
Figure 2:
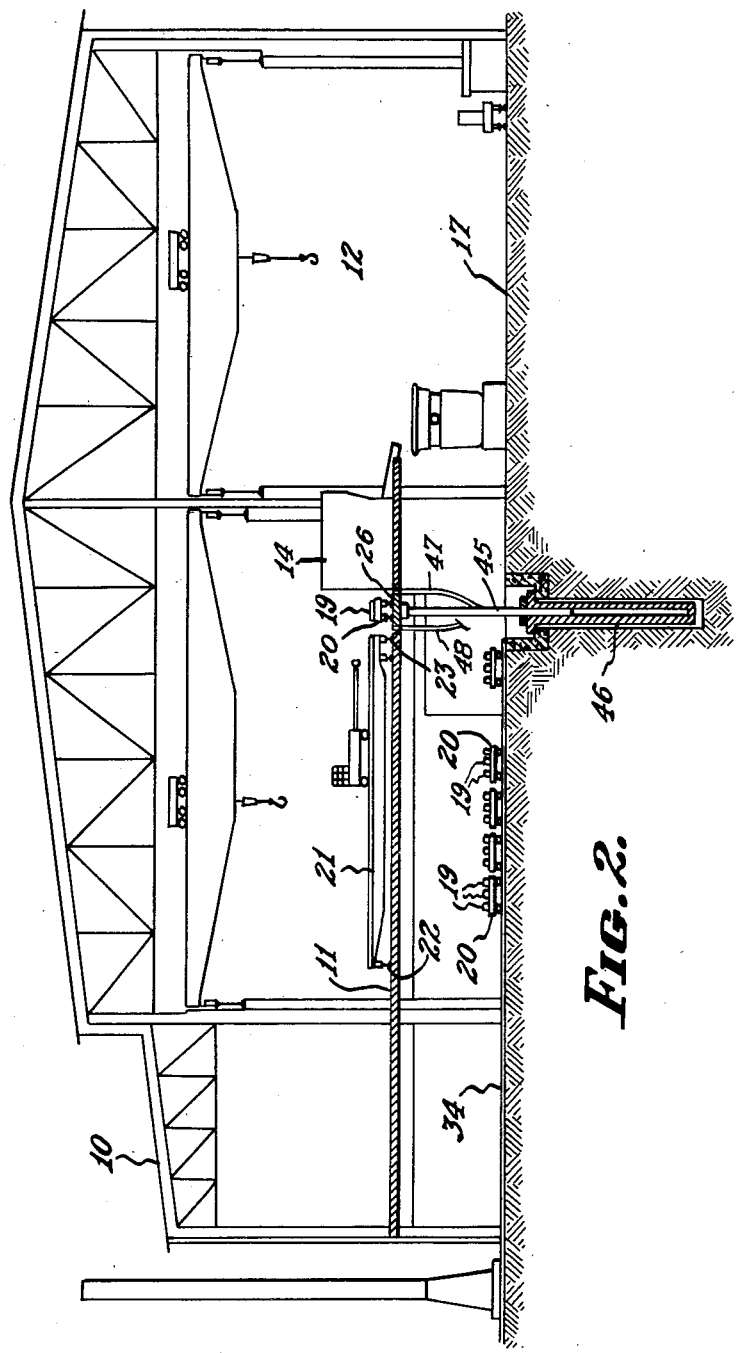
Figure 2 is a cross-sectional view through the plant of Figure 1, taken on the line 2—2 of Figure 1.

Referring now to the drawings for a more detailed description of the invention, I have shown by way of example, in Figure 2 a cross section of an open hearth steel plant having the conventional lean-to 10, the charging floor 11, and the pouring pit 12. The furnaces themselves are indicated at 13, 14, 15 and 16. In Figure 2 the yard level is indicated at 17, and in Figure 1 the portion of the plant to the right of the break line is shown at yard level, whereas the portion to the left of the break is shown at charging floor level. In Figure 1 a scrap building is indicated at 18 and serves for the storage and loading of scrap and other materials which are to be charged into the furnaces 13 to 16 inclusive. The building 18 is referred to in these specifications as a scrap loading station. The scrap which is to be charged into the furnaces is loaded into charging pans 19, which are carried on the charging cars 20. The furnaces are charged by means of a conventional charging machine indicated at 21, which rides on rails 22 and 23, which run the full length of the charging floor in front of the furnaces. The charging cars run on the rails 24 and 25 which pass in front of the furnaces between the furnaces and the charging machine tracks.

Sections of the rails 24 and 25 between each two furnaces and at each end of the battery are mounted upon platforms forming parts of a series of hydraulic elevators. The platforms are indicated at 26, 27, 28, 29 and 30. The hydraulic elevators, one of which is shown in detail in Figures 3 to 5 inclusive, are arranged to cause the platforms 26 to 30 inclusive, to execute a quarter-turn in moving from the charging floor level 11, to the yard level 17. It will be observed that in Figure 1 the platforms 26, 27 and 28 are shown at charging floor level as forming portions of the track 24 and 25, while the platforms 29 and 30 are shown at yard level connecting with other tracks to be described hereinafter.

As best seen in Figure 1, I have provided a track indicated generally at 31 leading out from the scrap loading station 18. Tracks 32, 33, 34, 35 and 36 connect with the track 31 by means of suitable switches at 37, 38, 39 and 40. The terminals of the tracks 32 to 36 inclusive enter beneath the charging floor 11 at yard level and these tracks are substantially at right angles to the track 24 and 25 on the charging floor, so that when the elevators and the platforms carried thereby are at yard level, the sections of track mounted on the platforms 26 to 30 inclusive connect with the tracks 32 to 36 inclusive.

In order to move the charging cars 20 when they are on the track 24 and 25, I may provide prime movers which may be electric locomotives as indicated at 41 and 42, one to each side of the charging machine 21. These prime movers may have movable pushing arms 43 and 44 respectively, by means of which they can engage the charging cars and position them as required. Under favorable conditions the charging cars may be moved between the elevators in either direction by the charging machine without the use of the locomotives 41 and 42, and this will be the preferred mode of operation.

In operation, assuming that it is desired to charge the furnace 14, a number of charging cars are loaded with pans containing the required amount of scrap steel and other materials to be charged into the furnace. The loaded cars 20 are then moved from the scrap loading station 18 over the track 31, over switch 37, onto the track 33. The platform 27 will be at yard level and a charging car is run onto the platform 27 by a car pusher or a car puller or by the yard locomotive. The elevator is then raised and during its rise to charging floor level it executes a quarter-turn so that it arrives at the position shown in Figure 1 at charging floor level. The charging machine 21, or the electric locomotive 41 by means of its pushing arm 43 engages the car 20 and moves it into position in front of the furnace 14. The charging machine 21 then charges the charge into the furnace, whereupon the charging machine 21, or the electric locomotive 42 pushes the car 20 onto the platform 28 which is at charging floor level. This elevator then descends with the platform 28 executing a quarter-turn so that the car 20 is brought down to yard level to run on track 34, whence it returns over switch 38 track 31 to the loading station 18. It will thus be clear that in charging the furnace 14 the only movement of the charging cars on the charging floor has been in the area between the platform 27 and the platform 28, and that the movement of cars has been one way, from left to right, as seen in Figure 1. Thus the operation of even furnaces 13 and 15 to each side of the one in question, has not been in any manner interfered with. It will be understood that preferably the tracks 32 to 36 inclusive will be of such length that enough charging cars 20 can be carried thereon to take care of the entire charge for the furnace at one time. Also it will be clear that the charging cars may be moved in either direction in front of the furnaces.

Coming now to a more detailed description of the hydraulic quarter-turn elevator, reference is had particularly to Figures 3 to 5 inclusive. The elevator comprises a plunger 45 operating in a cylinder 46 sunk into the ground beneath yard level, and is provided with suitable guiding means (not shown) to support the plunger during its travel. Secured to the hydraulic plunger 45 is a platform which, for example, may be the platform 26. This platform carries track sections 24a and 25a, which in the elevated position of the elevator constitute portions of the track 24 and 25, and which in their lowered position connect with the track 33. Extending between the carging floor 11 and the yard floor 17 are the helical cam rails 47 and 48. These cam rails will actually be compound helices to provide for an acceleration and deceleration near the ends of the turn. These cam rails are suitably secured by means of brackets 49 and 50, or the like, at their upper end and by means of brackets 51 and 52 at their lower end. These rails are of compound helical form covering one-quarter turn in less than the length of the stroke of the plunger 45. The platform 26 is slotted and provided with guide members 53 as best seen in Figure 5. The guide members 53 engage respectively the rails 47 and 48 so that as the elevator plunger descends, the platform 26 is caused to execute a quarter-turn in passing from charging floor level to yard level. Appropriate bumpers for the platform 26 may be provided as indicated generally at 54. The cam rails 47 and 48 may, if desired, be braced by means of a ring 55 held in position by strut 56 suitably secured to the charging floor 11.

Since the platform 26 is rectangular, and must fit into a rectangular hole in the charging floor, it must have a period of non-rotating travel at the upper end of the plunger stroke. Thus in the descending, the turn must commence after the platform clears the charging floor, and in rising, the turn must be completed before the platform reaches the charging floor. If the turn is not executed at yard level, it is necessary that the cam rails 47, 48 have a helical portion extending upward from yard level and terminating in a straight or dwell portion. The portion of the plunger stroke during which the turn must be completed will be determined by floor clearances in individual installations.

While I have described a specific hydraulic elevator arranged to execute a quarter-turn, it will be clear that in the broader claims I do not intend to limit myself to the specific type of elevator disclosed, nor do I intend to limit myself to exactly a quarter-turn. The tracks 32 to 36 inclusive could certainly, if desired, enter the building at an angle of 45° to the track 24 and 25, or at any other suitable angle. Also the platform 26 may be circular rather than rectangular if space considerations permit. If the platform is circular, it will be possible to complete the turn in substantially the full plunger stroke. The arrangement described herein is by way of example only, and therefore I do not intend to limit myself otherwise than as specifically set forth in the claims which follow.

Having now fully described my invention what I claim as new and desire to secure by Letters Patent is:

1. A steel melting plant comprising a battery of furnaces side by side, a charging floor in front of said battery above yard level, a track for charging cars running substantially the length of said battery on said charging floor, sections of said track between each two furnaces, and at each end of said battery being movable to and from a position at yard level, means for moving each of said sections of track between said yard level and charging floor, a scrap loading station at yard level at a remote point, and tracks leading from said scrap loading station to positions to connect with each of said sections of track at yard level.

2. A steel melting plant comprising a battery of furnaces side by side, a charging floor in front of said battery above yard level, a track for charging cars running substantially the length of said battery on said charging floor, a quarter-turn elevator between each two furnaces and at each end of said battery, movable from yard level to and from charging floor level, each of said elevators carrying a section of said track, a scrap loading station at yard level at a remote point, and tracks leading from said scrap loading station to each of said elevators at yard level and positioned to connect with said sections of track when said elevators are at yard level.

3. A steel melting plant comprising a battery of furnaces side by side, a charging floor in front of said battery of furnaces above yard level, a track for charging cars running substantially the length of said battery on said charging floor, a section of said track between each two furnaces and at each end of said battery being mounted on elevators, a second track on said charging floor and a charging machine arranged for movement along said second track, means for moving charging cars along said first mentioned track, a scrap loading station at yard level at a remote point, and tracks leading from said scrap loading station to each of said elevators at yard level, the terminal sections of said tracks at yard level being at right angles to the tracks on said charging floor, said elevators being provided with means to cause said sections of track mounted on said elevators to describe substantially a quarter turn in passing from one level to the other level.

4. A steel melting plant comprising a battery of furnaces side by side, a charging floor, in front of said battery of furnaces above yard level, a track for charging cars running substantially the length of said battery on said charging floor, a section of said track between each two furnaces and at each end of said battery being mounted on elevators, a second track on said charging floor and a charging machine arranged for movement along said second track, another track on said charging floor and a prime mover arranged to run on said other track, one to each side of said charging machine, a scrap loading station at yard level at a remote point, and tracks leading from said scrap loading station to each of said elevators at yard level, the terminal sections of said tracks at yard level being at right angles to the tracks on said charging floor, said elevators being provided with means to cause said sections of track mounted on said elevators to describe substantially a quarter turn in passing from one level to the other level.

5. A steel melting plant comprising a battery of furnaces side by side, a charging floor in front of said battery of furnaces above yard level, a track for charging cars running substantially the length of said battery on said charging floor, a section of said track between each pair of furnaces and at each end of said battery being mounted on hydraulic elevators, a second track on said charging floor and a charging machine arranged for movement along said second track, means for moving charging cars along said first mentioned track, a scrap loading station at yard level at a remote point, and tracks leading from said loading station to each of said hydraulic elevators at yard level, the terminal sections of said last mentioned tracks being at right angles to the tracks on said charging floor, said hydraulic elevators being provided with cam means to cause said sections of track mounted on said elevators to describe substantially a quarter turn in passing from one level to the other level.

6. A steel melting plant comprising a battery of furnaces side by side, a charging floor in front of said battery of furnaces above yard level, a track for charging cars running substantially the length of said battery on said charging floor, a section of said track between each pair of furnaces and at each end of said battery being mounted on hydraulic elevators, a second track on said charging floor and a charging machine arranged for movement along said second track, a third track on said charging floor, and a pair of prime movers arranged to run on said third track, one to each side of said charging machine, a scrap loading station at yard level at a remote point, and tracks leading from said loading station to each of said hydraulic elevators at yard level, the terminal sections of said last mentioned tracks being at right angles to the tracks on said charging floor, said hydraulic elevators being provided with cam means to cause said sections of track mounted on said elevators to describe substantially a quarter turn in passing from one level to the other level.

7. A hydraulic elevator comprising a plunger carrying a platform, a cam rail for said platform, said cam rail having an axial length equal to the travel of the plunger and being of helical form over an axial length less than the travel of said plunger, and having its ends spaced circumferentially of said plunger, and a guide element on said platform for sliding engagement with said cam rail, to cause said elevator platform to execute a turn in moving through that length of the plunger stroke corresponding to the helical portion of said cam rail.

8. A hydraulic elevator comprising a plunger carrying a platform, a cam rail for said platform, said cam rail having an axial length equal to the travel of the plunger and being of helical form over an axial length less than the travel of said plunger, and having its ends substantially 90° apart radially of said plunger, and a guide element on said platform for sliding engagement with said cam rail, to cause said elevator platform to execute a 90° turn in moving through the length of the plunger stroke corresponding to the helical portion of said cam rail.

9. A hydraulic elevator comprising a plunger carrying a platform, a pair of cam rails for said platform, said cam rails having an axial length equal to the travel of the plunger and being of helical form over an axial length less than the travel of said plunger, having their ends spaced circumferentially of said plunger over the length of said plunger, and spaced apart diametrically of said plunger, and guide elements on said platform for sliding engagement with said cam rails, to cause said elevator platform to execute a turn in moving through the length of the plunger stroke corresponding to the helical portion of said cam rail.

10. A hydraulic elevator comprising a plunger carrying a platform, a pair of cam rails for said platform, said cam rails having an axial length equal to the travel of the plunger and being of helical form over an axial length less than the travel of said plunger, extending 90° radially of said plunger over the length of said plunger, and spaced apart diametrically of said plunger, and guide elements on said platform for sliding engagement with said cam rails, to cause said elevator platform to execute a 90° turn in moving through the length of the plunger stroke corresponding to the helical portion of said cam rail.

EDWARD N. MILLAN.

REFERENCES CITED

The following references are of record in the file of this patent:

UNITED STATES PATENTS

| Number | Name | Date |
| --- | --- | --- |
| 872,046 | Blair, Jr. | Nov. 26, 1907 |